US009959189B2

(12) United States Patent
Katou et al.

(10) Patent No.: US 9,959,189 B2
(45) Date of Patent: May 1, 2018

(54) SERVER MONITORING DEVICE AND SERVER MONITORING SYSTEM

(71) Applicant: PACIFIC INDUSTRIAL CO., LTD., Ogaki-shi, Gifu (JP)

(72) Inventors: Michiya Katou, Ichinomiya (JP); Zenichirou Hara, Ibi-gun (JP); Katsushi Miwa, Ogaki (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 347 days.

(21) Appl. No.: 14/761,265

(22) PCT Filed: Feb. 24, 2014

(86) PCT No.: PCT/JP2014/054277
§ 371 (c)(1),
(2) Date: Jul. 15, 2015

(87) PCT Pub. No.: WO2014/132908
PCT Pub. Date: Sep. 4, 2014

(65) Prior Publication Data
US 2015/0347259 A1 Dec. 3, 2015

(30) Foreign Application Priority Data
Feb. 27, 2013 (JP) .................................. 2013-036660

(51) Int. Cl.
*G06F 11/32* (2006.01)
*H04N 7/18* (2006.01)
(Continued)

(52) U.S. Cl.
CPC ............ *G06F 11/326* (2013.01); *G06F 3/048* (2013.01); *G06F 11/30* (2013.01);
(Continued)

(58) Field of Classification Search
CPC ........ G06F 11/326; G06F 11/86; G06F 21/86; G06F 11/3055; G06F 11/3065;
(Continued)

(56) References Cited

U.S. PATENT DOCUMENTS 5,754,112 A * 5/1998 Novak .................. G06F 11/325
340/332
5,790,374 A * 8/1998 Wong .................. G02B 6/0005
361/679.32

(Continued)

FOREIGN PATENT DOCUMENTS

CN  102263807 A  11/2011
CN  203104923  *  7/2013

(Continued)

OTHER PUBLICATIONS

Oct. 11, 2016 Extended Search Report issued in European Patent Application No. 14756531.1.

(Continued)

*Primary Examiner* — David Harvey
(74) *Attorney, Agent, or Firm* — Oliff PLC

(57) ABSTRACT

[Problem] To provide a server monitoring device capable of grasping the state of a server more rapidly than conventional ones, and a server monitoring system. [Solution] This server monitoring device has a configuration in which a plurality of optical fibers are optically coupled to a plurality of light-emitting elements each showing the operating state of a server by a lighting mode, and the end surfaces of the plurality of optical fibers on the opposite side to the light-emitting elements are secured in a predetermined arrangement. An image of a light emission pattern of the end surfaces of the optical fibers is captured by a camera, and the image is transmitted to a monitoring person.

20 Claims, 14 Drawing Sheets

(51) Int. Cl.
*G06F 11/30* (2006.01)
*H04N 5/232* (2006.01)
*G06F 3/048* (2013.01)
*G06K 9/00* (2006.01)

(52) U.S. Cl.
CPC ...... *G06F 11/3044* (2013.01); *G06F 11/3055* (2013.01); *G06F 11/3065* (2013.01); *G06F 11/3093* (2013.01); *G06F 11/32* (2013.01); *G06K 9/00* (2013.01); *H04N 5/23206* (2013.01); *H04N 7/183* (2013.01); *G06K 2209/03* (2013.01)

(58) Field of Classification Search
CPC ...... G06F 3/048; G06F 11/30; G06F 11/3044; G06F 11/3093; G06F 11/32; H04N 7/183; H04N 5/23206; G06K 9/00; G06K 2209/03
See application file for complete search history.

(56) References Cited

U.S. PATENT DOCUMENTS

| | | | | |
|---|---|---|---|---|
| 6,919,816 | B2* | 7/2005 | Dearborn | G06F 11/326 312/223.5 |
| 6,924,780 | B1* | 8/2005 | Horst | G09G 3/32 345/55 |
| 7,733,646 | B2* | 6/2010 | Hisatsune | H05K 7/20172 174/383 |
| 7,857,214 | B2* | 12/2010 | Saliaris | G06F 1/181 235/383 |
| 7,965,884 | B2* | 6/2011 | Wu | G06T 7/001 250/227.2 |
| 8,094,020 | B2* | 1/2012 | Groth | G06Q 10/087 340/539.1 |
| 8,223,015 | B2* | 7/2012 | Yuuki | G06F 11/326 340/286.02 |
| 9,267,983 | B2* | 2/2016 | O'Toole | G01R 31/2635 |
| 2001/0056336 | A1* | 12/2001 | Suzuki | G06F 11/325 702/188 |
| 2003/0161163 | A1* | 8/2003 | Hussey | G01R 31/2635 362/487 |
| 2003/0197619 | A1* | 10/2003 | Lawrence | H05K 7/1498 340/635 |
| 2006/0097863 | A1* | 5/2006 | Horowitz | G06K 7/10079 340/521 |
| 2008/0011514 | A1* | 1/2008 | Zheng | G02B 6/4452 174/72 R |
| 2011/0296230 | A1 | 12/2011 | Chen et al. | |
| 2012/0166693 | A1* | 6/2012 | Weinstock | H05K 7/1498 710/105 |
| 2012/0229633 | A1* | 9/2012 | Boucino | H04N 7/183 348/143 |
| 2013/0308133 | A1* | 11/2013 | Sun | G01J 3/0218 356/402 |
| 2014/0292167 | A1* | 10/2014 | Sojka | H05K 7/1498 312/234 |
| 2015/0347259 | A1* | 12/2015 | Katou | G06F 3/048 348/143 |

FOREIGN PATENT DOCUMENTS

| | | | |
|---|---|---|---|
| GB | 1588698 | * | 4/1981 |
| JP | 02115810 A | * | 4/1990 |
| JP | H06-130310 A | | 5/1994 |
| JP | 2002-016947 A | | 1/2002 |
| JP | 2004-008505 A | | 1/2004 |
| JP | 2004-021362 A | | 1/2004 |
| JP | 2004-021632 A | | 1/2004 |
| JP | 2004-220288 A | | 8/2004 |
| JP | 2005-242916 A | | 9/2005 |
| JP | 2009238066 | * | 10/2009 |
| JP | 2010-003019 A | | 1/2010 |
| JP | 2012-238116 A | | 12/2012 |
| JP | 2013-254481 A | | 9/2013 |
| RU | 2323054 C2 | * | 4/2008 |

OTHER PUBLICATIONS

Apr. 1, 2014 Search Report issued in International Application No. PCT/JP2014/054277.
Sep. 1, 2015 International Preliminary Report on Patentability issued in International Patent Application No. PCT/JP2014/054277.
Dec. 16, 2015 Office Action issued in Japanese Patent Application No. 2013-036660.
Feb. 4, 2017 Office Action issued in Chinese Patent Application No. 201480010120.8.

* cited by examiner

SERVER MONITORING DEVICE AND SERVER MONITORING SYSTEM

TECHNICAL FIELD

The present invention relates to a server monitoring system that monitors a server accessible via a communication network from a remote site, and a server monitoring device to be used in the server monitoring system.

BACKGROUND ART

Conventionally, to monitor a server from a remote site, a method was employed in which an operator dispatched to the installation location of the server was made to check lighting modes of a plurality of lamps that indicated the state of the server thereby to grasp the state of the server (for example, refer to Patent Document 1).

CITATION LIST

Patent Literature

Patent Document 1: Japanese Unexamined Patent Application Publication No. 2004-21362 (paragraph [0002])

SUMMARY OF THE INVENTION

Problem to be Solved by the Invention

However, when the above-described server monitoring method was employed, it took time for the operator to check the lamps, and it was difficult to quickly grasp the state of the server.

The present invention was made in view of the above-described circumstances, and an object thereof is to provide a server monitoring device and a server monitoring system capable of grasping the state of a server more quickly than conventional ones.

Means for Solving the Problem

A server monitoring device (10) according to an invention of Claim 11 made in order to achieve the above-described object is a server monitoring device (10) that is used for monitoring the state of a server (90) accessible via a communication network (103) from a remote site, and is characterized by including an optical fiber starting end securing means (81A, 84, 85) that holds one end portions of a plurality of optical fibers (20) in a state where the one end portions are optically coupled to a plurality of light-emitting elements (92) that are provided on a front surface (91Z) of the server (90) and indicate the state of the server (90), an optical fiber terminal end securing means (22) that holds end surfaces of the other end portions of the plurality of optical fibers (20) so as to be in a predetermined arrangement, a camera (30) that captures an image of a light emission pattern of the arrangement of the end surface group of the optical fibers (20), an image transmitting means (40) for transmitting the image of the light emission pattern to a monitoring person (101) who monitors the server (90), a plurality of reference light-emitting elements (24) that are provided on the optical fiber terminal end securing means (22) and can emit light at reference positions at which the end surfaces of the optical fibers (20) are arranged, a pair of linear motion guides (81A) as the optical fiber starting end securing means (81A, 84, 85) that are attached to a server rack (93) accommodating the server (90) and extend in parallel to a first direction being either one of left-right and up-down directions of the front surface (91Z) of the server (90), a plurality of bridge bars (83) as the optical fiber starting end securing means (81A, 84, 85) that extend in a second direction being the other one of the left-right and up-down directions and are bridged at arbitrary positions in the longitudinal directions of the pair of linear motion guides (81A), and a first optical fiber holding member (84, 85) as the optical fiber starting end securing means (81A, 84, 85) that is attached at an arbitrary position in a longitudinal direction of the bridge bars (83) and can hold the one end portion of the optical fiber (20) in a state where the one end portion is optically coupled to the light-emitting element (92).

Here, the "communication network" in the present invention includes the Internet, a local area network (LAN), a wide area network (WAN), or the like, and may be a wired line or a wireless line.

The "camera" in the present invention may capture images in black and white, or may capture images in colors. When it captures images in colors, differences among light emitting colors of the light-emitting elements can be distinguished. The camera may capture an image of a light emission pattern as a moving image or a still image. In the case where the camera captures an image as a moving image, even when the light-emitting elements indicate the state of the server by blinking, the camera can capture an image of the lighting modes. Image capturing by the camera may be performed periodically, or performed only upon request from the monitoring person. In the case where the camera captures a moving image, image capturing may always be performed.

The "image transmitting means" may transmit an image periodically, or may transmit an image only upon request from the monitoring person. In the case where a moving image is transmitted, a moving image may always be transmitted. The path of transmission of an image by the image transmitting means to the monitoring person may be the above-described "communication network," or another exclusive line. This exclusive line may be wired or wireless.

An invention of Claim 13 is a server monitoring device (10) to be used for monitoring the state of a server (90) accessible via a communication network (103) from a remote site, characterized by including an optical fiber starting end securing means (70, 74) that holds one end portions of a plurality of optical fibers (20) in a state where the one end portions are optically coupled to a plurality of light-emitting elements (92) that are provided on a front surface (91Z) of the server (90) and indicate the state of the server (90), an optical fiber terminal end securing means (22) that holds end surfaces of the other end portions of the plurality of optical fibers (20) so as to be in a predetermined arrangement, a camera (30) that captures an image of a light emission pattern of the arrangement of the end surface group of the optical fibers (20), an image transmitting means (40) for transmitting the image of the light emission pattern to a monitoring person (101) who monitors the server (90), a plurality of reference light-emitting elements (24) that are provided on the optical fiber terminal end securing means (22) and can emit light at reference positions at which the end surfaces of the optical fibers (20) are arranged, a support net panel (70) formed by stretching a net body (72) over the inside of a frame body (71) to be attached to a server rack (93) accommodating the server (90), and a second optical fiber holding member (74) as the optical fiber starting end securing means (70, 74) that secures the one end portion of the optical fiber (20) in an arbitrary mesh of the net body (72) in an inserted state and can hold the one end portion of the optical fiber (20) in a state of being optically coupled to the light-emitting element (92).

MODES FOR CARRYING OUT THE INVENTION

First Embodiment

Figure 1:
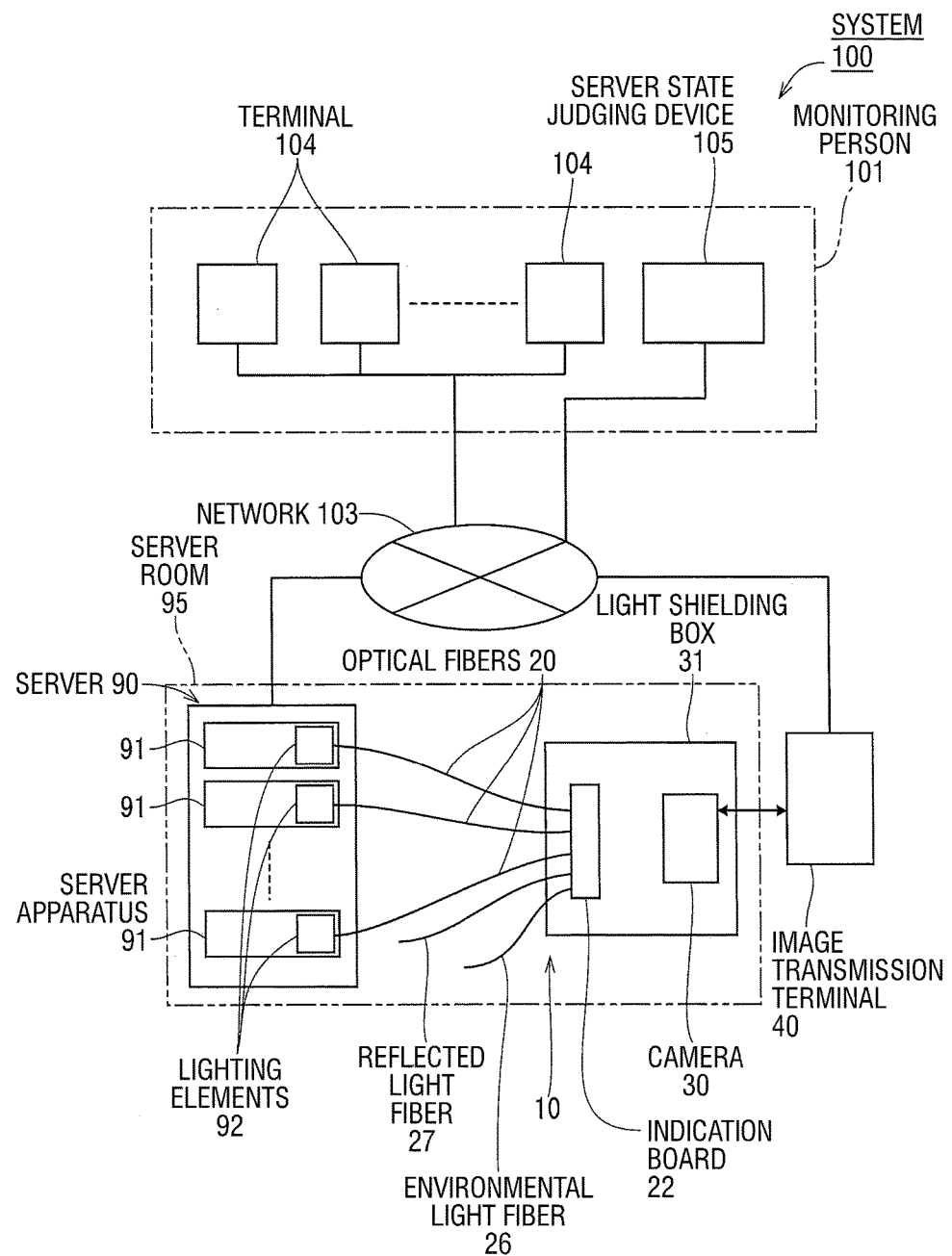
FIG. 1 is an overall configuration drawing of a server monitoring system according to a first embodiment of the present invention.

Hereinafter, an embodiment of a server monitoring device and a server monitoring system according to the present invention is described with reference to FIG. 1 to FIG. 7. As shown in FIG. 1, the server monitoring system 100 according to the present embodiment is used by a borrower 101 who has rented a server 90 from a rental server provider to monitor the state of the server 90. As shown in the same figure, the server 90 is accessible from a terminal 104 owned by the borrower 101 (hereinafter, referred to as a "monitoring person 101") of the server 90, via a communication network 103. The server monitoring system 100 includes a server monitoring device 10 that monitors the state of the server 90 at a location where the server 90 is placed, and a server state judging device 105 that is connected to the server monitoring device 10 via the communication network 103 and informs the monitoring person 101 of the state of the server 90.

Figure 2:
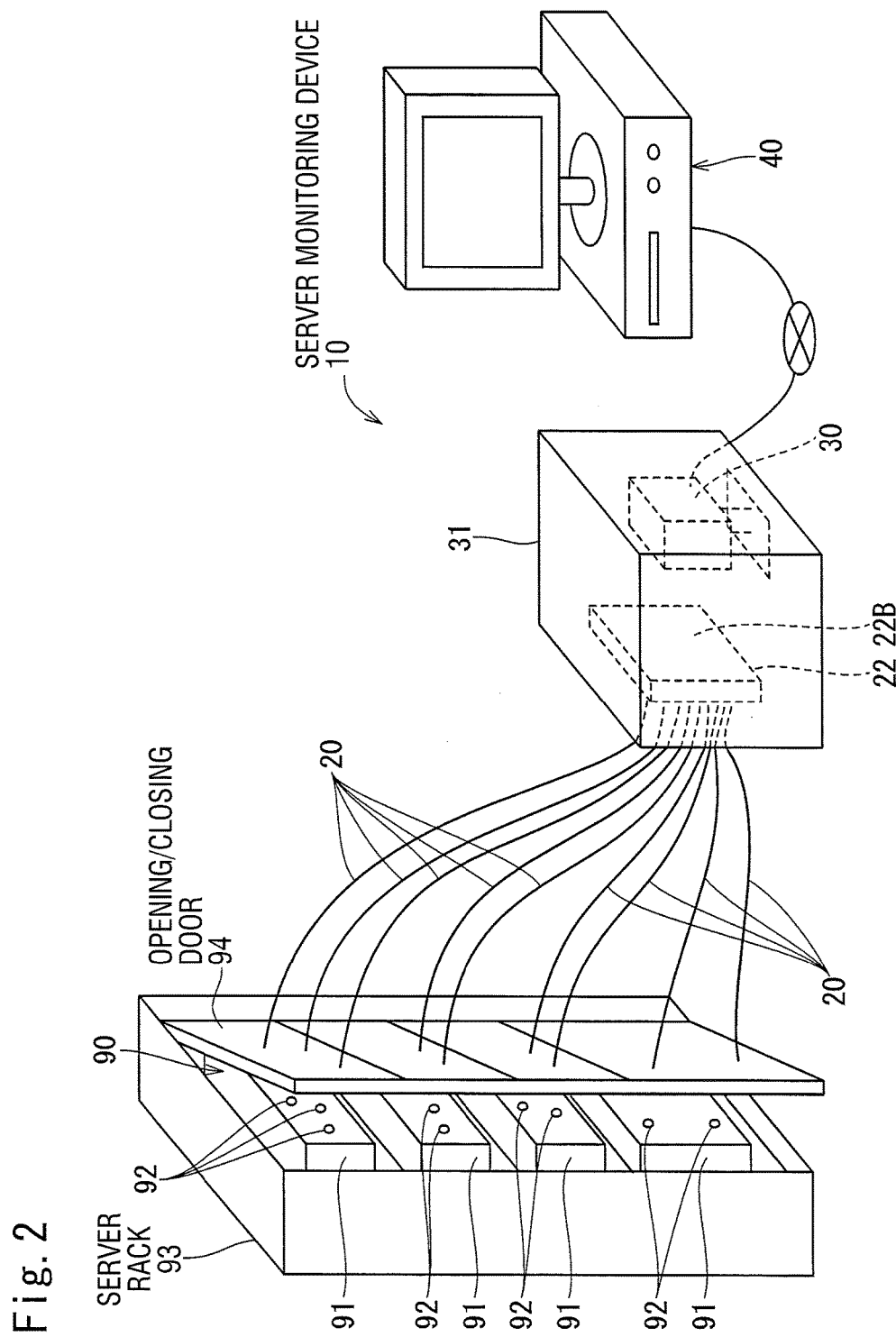
FIG. 2 is a perspective view of a server and a server monitoring device.

The server 90 is placed in the server room 95 that the rental server provider of the server 90 owns. As shown in FIG. 2, the server 90 includes a plurality of server apparatuses 91, and the server apparatuses 91 are secured to a server rack 93 while arranged vertically. Further, on the front side of the server rack 93, an opening and closing door 94 that turns around one side portion thereof is provided, and the opening and closing door 94 covers the front surfaces of the plurality of server apparatuses 91. In the server room 95, for example, a plurality of servers (not shown) are provided in addition to the above-described server 90, and are rented by third parties other than the monitoring person 101.

Figure 3:
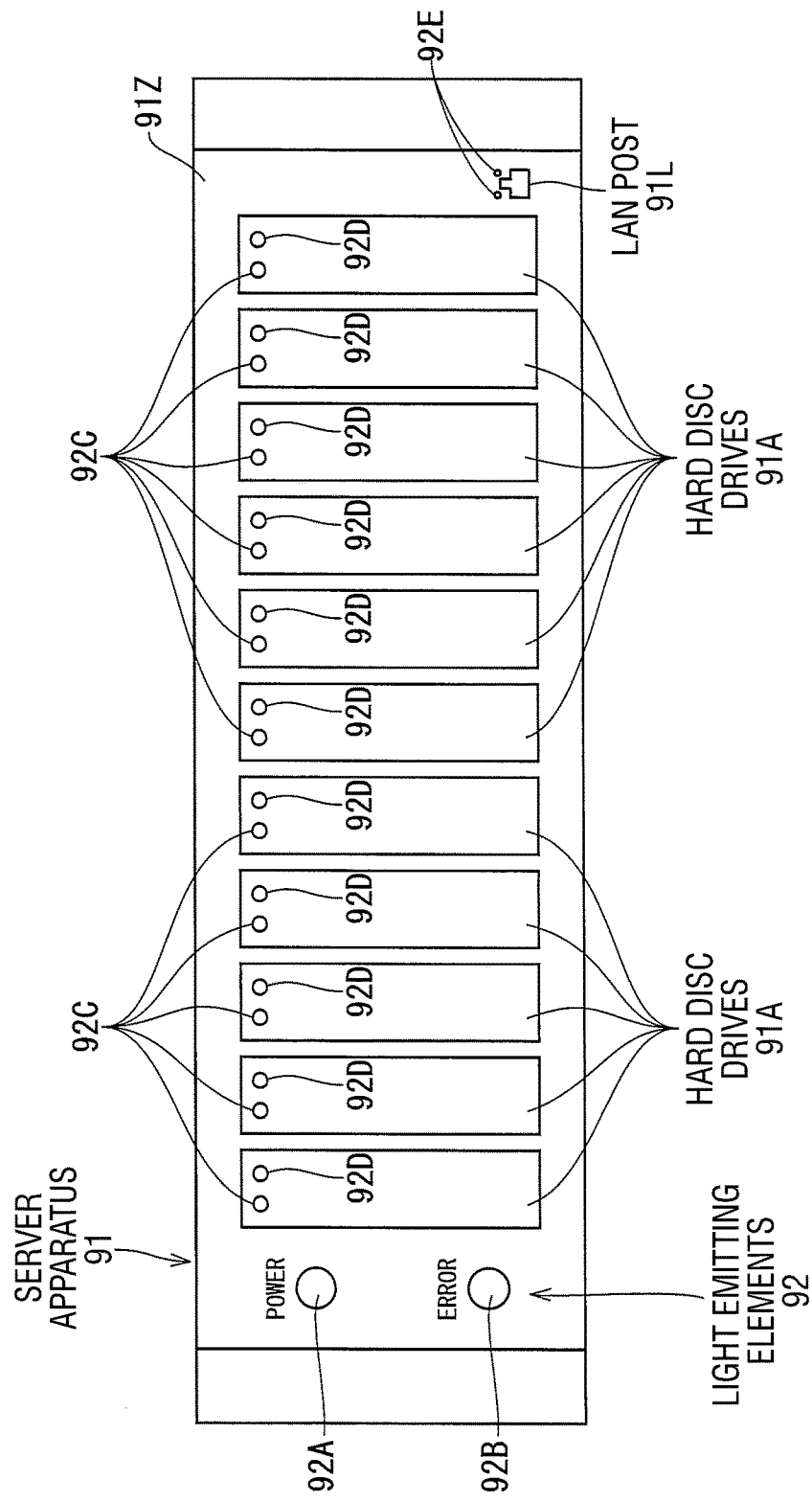
FIG. 3 is a front view of a server apparatus.

Each server apparatus 91 has a rectangular parallelepiped shape, and on the front surface 91Z thereof (that is also the front surface of the server 90), a plurality of light-emitting elements 92A to 92E (hereinafter, "light-emitting elements 92A to 92E" can also be collectively referred to as "light-emitting elements 92") are provided. FIG. 3 shows an example of the front surface 91Z of the server apparatus 91. The light-emitting element 92A in this figure is a power indication light, and is turned on in, for example, red when the server apparatus 91 is on, and is turned off when the server apparatus 91 is off. The light-emitting element 92B is a fault light, and is turned on in, for example, yellow when the server apparatus 91 is at fault, and is turned off when the server apparatus is not at fault. The server apparatus 91 shown in the same figure has a plurality of hard disk drives 91A, and each hard disk drive 91A is provided with light-emitting elements 92C, 92D. The light-emitting element 92C is turned on in, for example, green when the hard disk drive 91A operates, and is turned off when the hard disk drive 91A does not operate. The light-emitting element 92D blinks in, for example, yellow when the hard disk drive 91A is at fault, and blinks in, for example, green when the hard disk drive 91A is not connected to the communication network 103. The light-emitting element 92E is a LAN response lamp, and is turned on in, for example, green when the state of communication of the LAN to which the server apparatus 91 is connected via a LAN port 91L is good, and is turned off when the server apparatus is not connected to the LAN. That is, the light-emitting elements 92 are turned off or turned on/blink depending on the state of the server apparatus 91.

Thus, the lighting modes of the plurality of light-emitting elements 92 show the state of the server 90. Therefore, by installing a camera in the server room 95 and capturing an image of the lighting modes of the light-emitting elements 92, the state of the server 90 can be grasped. However, as described above, in the server room 95, servers of third parties other than the monitoring person 101 are also placed, so that from the viewpoint of security, it is prohibited to capture an image of the condition inside the server room 95 by a camera. On the other hand, the server monitoring device 10 according to the present embodiment is configured so as to capture an image of the lighting modes of the light-emitting elements 92 while avoiding the security problem. Hereinafter, the detailed configuration of the server monitoring device 10 is described.

Figure 4:
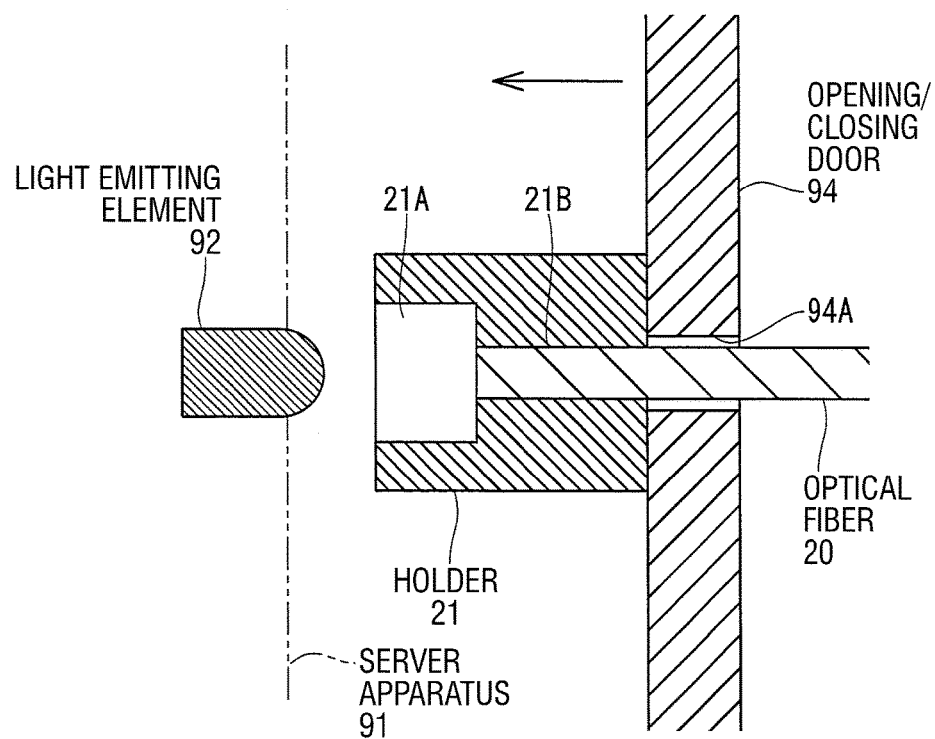
FIG. 4 is a sectional side view of an opening and closing door.

As shown in FIG. 2, the server monitoring device 10 includes a plurality of optical fibers 20 capable of being optically coupled to the plurality of light-emitting elements 92 provided on the server 90. In detail, as shown in FIG. 4, optical fiber insertion holes 94A are formed at positions facing the respective light-emitting elements 92 so as to penetrate through the opening and closing door 94, and the optical fibers 20 are secured to the back surface of the opening and closing door 94 by holders 21 attached to the tip end portions in a state where the optical fibers are inserted through the optical fiber insertion holes 94A. The holder 21 assumes a columnar shape as a whole, and has a receiving recessed portion 21A on the tip end surface. In the innermost surface of the receiving recessed portion 21A, an attaching hole 21B through which the optical fiber 20 is inserted and secured is opened. When the opening and closing door 94 is closed, the light-emitting element 92 is received by the receiving recessed portion 21A. With this configuration, the optical fibers 20 do not need to be directly secured to the server apparatuses 91 (server 90), so that the light-emitting elements 92 and the server apparatuses 91 can be easily replaced. In the present embodiment, the opening and closing door 94 and the holder 21 correspond to the "optical fiber starting end securing means" of the present invention.

The end portion of the optical fiber 20 on the side opposite to the light-emitting element 92 is secured to an indication board 22 (corresponding to the "optical fiber terminal end securing means" of the present invention) inside a light shielding box 31 that blocks entrance of light from the outside. In detail, the indication board 22 is structured so that the indication board has a plurality of optical fiber connecting holes 22A (refer to FIG. 6) arranged in a matrix, and one end of the group of the optical fiber connecting holes 22A is closed by a projecting plate 22B overlaid on the surface side of the indication board 22. The terminal end portions of the plurality of optical fibers 20 are inserted and secured into the plurality of optical fiber connecting holes 22A in a predetermined arrangement, and lights of the light-emitting elements 92 transmitted by the optical fibers 20 are projected on the projecting plate 22B.

In detail, the plurality of optical fibers 20 are inserted into the optical fiber connecting holes 22A in the separate lines of the matrix arrangement for each server apparatus 91 so that the end surfaces of the optical fibers 20 coupled to the light-emitting elements 92 of one server apparatus 91 are arranged side by side in a line of the matrix arrangement. The optical fibers 20 disposed in the same line are inserted through the separate optical fiber connecting holes 22A for each kind of the light-emitting elements 92 to which the optical fibers are coupled. That is, on the indication board 22 (projecting plate 22B), a two-dimensional coordinate system showing the kinds of server apparatuses 91 by positions in the vertical direction and the kinds of light-emitting elements 92 by positions in the horizontal direction is formed.

Figure 6:
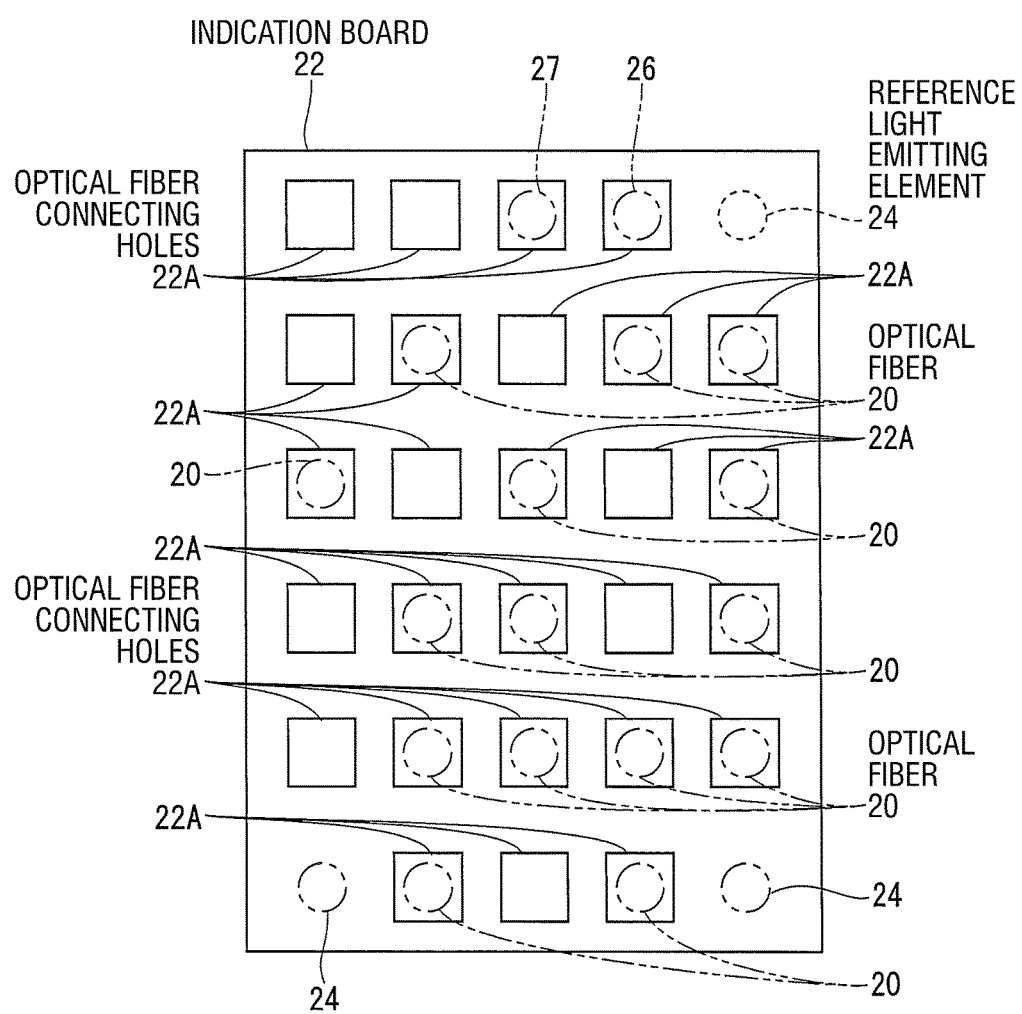
FIG. 6 is a diagram of an indication board viewed from the back.
Figure 7:
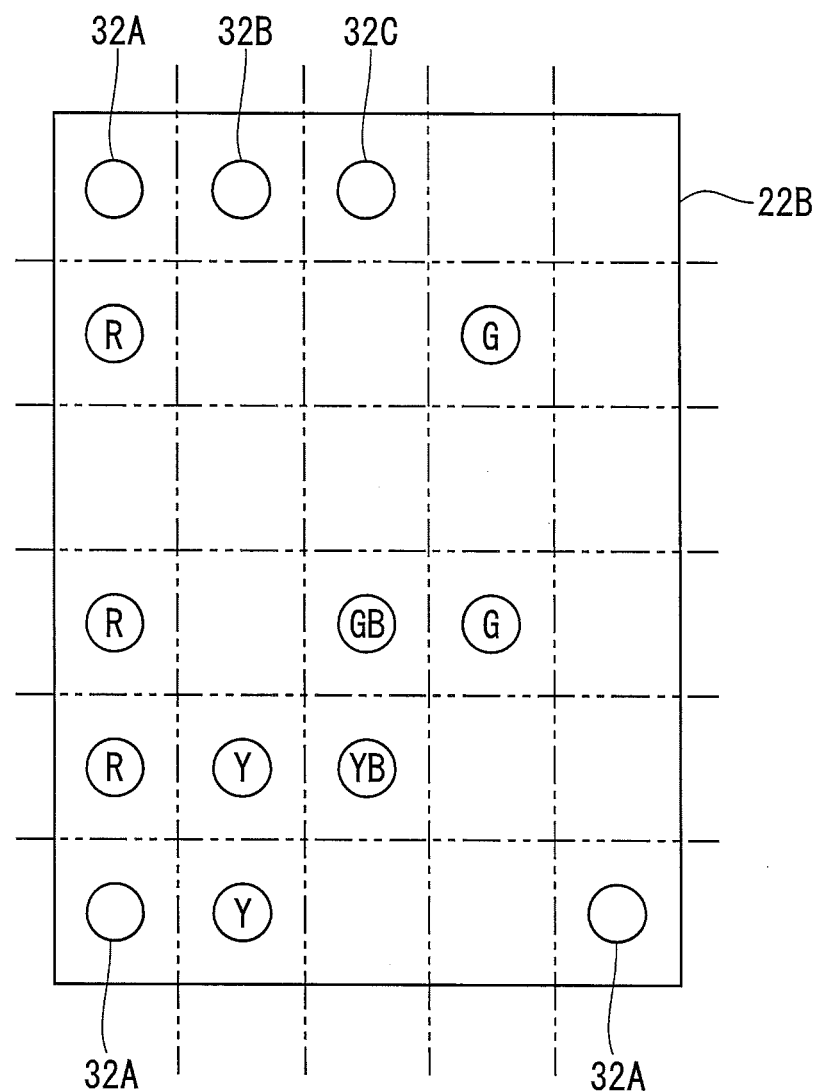
FIG. 7 is a diagram showing an example of a light emission pattern of a projecting plate.

As shown in FIG. 6, at three positions of the upper right corner, the lower right corner, and the lower left corner of the indication board 22 as viewed from the back side thereof, reference light-emitting elements 24 that can emit light at the reference positions on the projecting plate 22B (the upper left corner position, the lower left corner position, and the lower right corner position in FIG. 7, refer to the reference sign 32A) are provided. Accordingly, the coordinate axes on the projecting plate 22B are determined, so that, for example, even in the case where only one point of the optical fibers 20 emits light, the position of the light emission on the projecting plate 22B can be judged based on its coordinate position. The reference light-emitting elements 24 may be configured to always emit light, or emit light when receiving instructions from the monitoring person 101.

Figure 5:
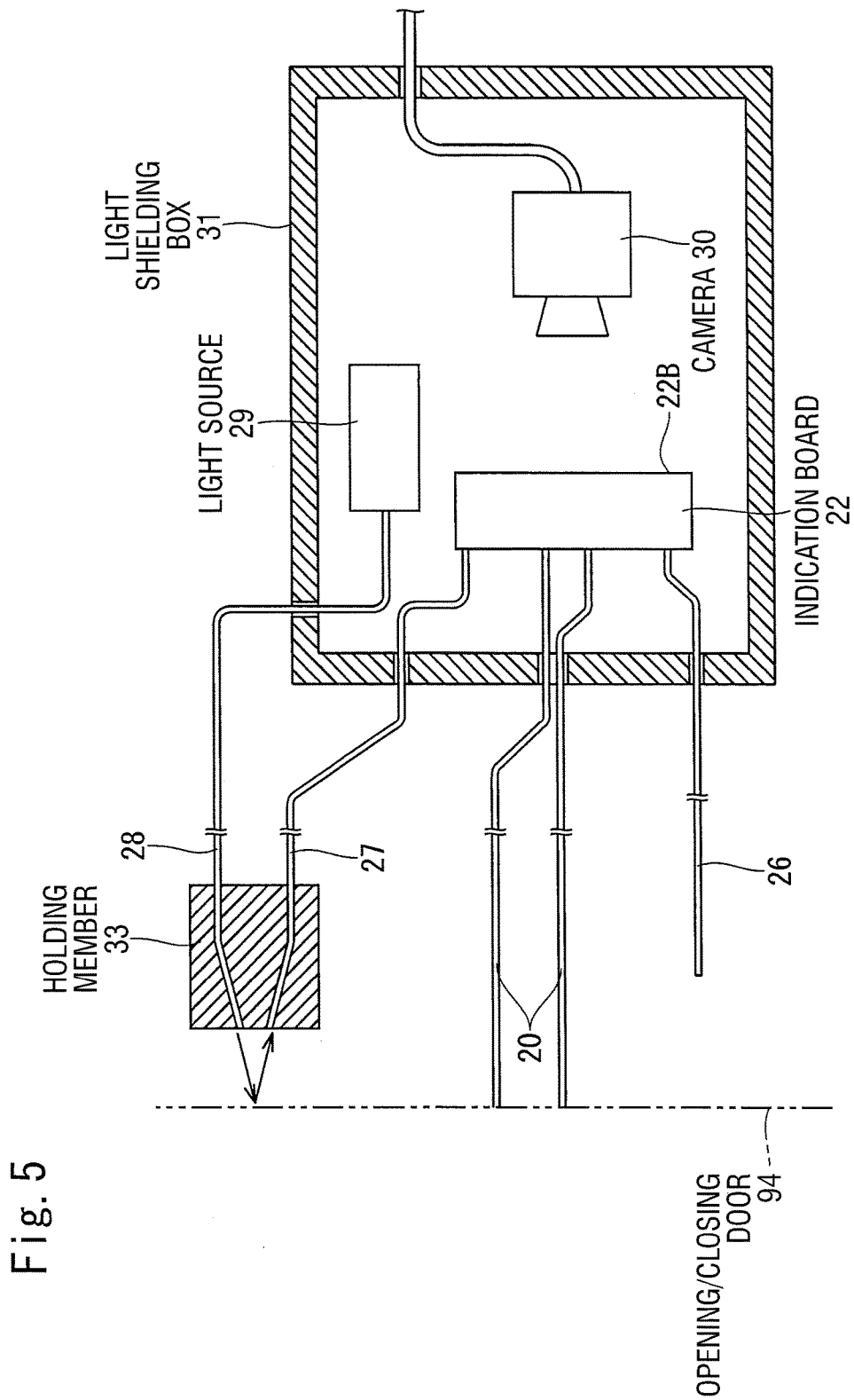
FIG. 5 is a sectional plan view of a light shielding box and a holding member.

As shown in FIG. 5, to the indication board 22, an environmental light optical fiber 26 is connected. The end portion of the environmental light optical fiber 26 on the side opposite to the indication board 22 is disposed inside the server room 95 so as to be able to take in indoor light of the server room 95. The base end portion of the environmental light optical fiber 26 is inserted through the optical fiber connecting hole 22A so that the indoor light of the server room 95 is projected onto the projecting plate 22B. In FIG. 5, the wire diameters of the various optical fibers connected to the indication board 22 (in detail, the optical fibers 20, the environmental light optical fiber 26, and a reflected light optical fiber 27 and an outgoing light optical fiber 28 described next) are shown exaggerated in diameter size.

As shown in FIG. 5, inside the light shielding box 31, a light source 29 is provided, and the outgoing light optical fiber 28 that is optically coupled to the light source 29 and transmits light of the light source 29 is drawn out to the outside of the light shielding box 31. The end portion of the outgoing light optical fiber 28 on the side opposite to the light source 29 is held by a holding member 33 facing the opening and closing door 94 of the server rack 93 secured to the server room 95. This holding member 33 holds the reflected light optical fiber 27 separately from the outgoing light optical fiber 28. The reflected light optical fiber 27 can transmit reflected light reflected by the opening and closing door 94 of light from the outgoing light optical fiber 28 toward the indication board 22 only when the opening and closing door 94 is disposed at the closed position. The end portion of the reflected light optical fiber 27 on the side opposite to the holding member 33 and the opening and closing door 94 is inserted through the optical fiber connecting hole 22A so that light from the reflected light optical fiber 27 is projected onto the projecting plate 22B (refer to FIG. 6). Accordingly, from a light emission pattern of the projecting plate 22B, whether or not the opening and closing door 94 is closed can be judged. In the present embodiment, the light source 29 and the outgoing light optical fiber 28 constitute the "output means" of the present invention.

As shown in FIG. 5, in the light shielding box 31, a camera 30 for capturing an image of a light emission pattern of the projecting plate 22B is housed. The camera 30 is connected to an image transmission terminal 40, and captures an image of the projecting plate 22B in response to a command from this image transmission terminal 40, and transmits the captured image data to the image transmission terminal 40. The camera 30 is capable of capturing a moving image in colors.

Here, the light shielding box 31 may be placed in the server room 95, or placed outside the server room 95 (FIG. 1 shows an example of installation inside the server room 95). As described above, the camera 30 is housed inside the light shielding box 31, so that even when the light shielding box 31 is placed inside the server room 95, an image of the condition inside the server room 95 is not captured by the camera 30. Accordingly, the security problem that the camera 30 captures an image of a server of a third party is avoided.

FIG. 7 shows an example of the light emission pattern of the projecting plate 22B captured by the camera 30. In the same figure, "R," "Y," and "G," show lighting in red, yellow, and green, respectively, and "RB," "YB," and "GB," show blinking in red, yellow, and green, respectively. The three bright spots 32A on the left corner of the uppermost line and the both ends of the lowermost line are light emission from the reference light-emitting elements 24. The bright spot 32B of two bright spots 32B, 32C that is on the immediate right of the bright spot 32A in the uppermost line is light emission from the environmental light optical fiber 26 and lights up in the same color as that of indoor light of the server room 95, and the bright spot 32C is light emission from the reflected light optical fiber 27 and lights up in the same color as that of light emission of the light source 29.

As described above, on the projecting plate 22B, a two-dimensional coordinate system showing the kinds of server apparatuses 91 by positions in the vertical direction and the kinds of light-emitting elements 92 by positions in the horizontal direction is formed, and from the coordinate system based on the reference light-emitting elements 24 on the three corners and the light emission pattern of the projecting plate 22B, which light-emitting element 92 is turned off or which color the light-emitting element 92 lights up/blinks in can be identified. Since the reference light-emitting elements 24 are disposed on the three corners, even if zooming of the camera and the angle between the camera and the projecting plate 22B, etc., vary among images, the coordinate positions can be identified. Accordingly, the lighting modes of the plurality of light-emitting elements 92 in each server apparatus 91, that is, the state of the server 90 can be grasped.

As shown in FIG. 1 and FIG. 2, the camera 30 is connected to the image transmission terminal 40 (corresponding to the "image transmitting means" of the present invention) via a network, and can transmit captured image data to the image transmission terminal 40. The image data may be still image data such as a JPEG file, or moving image data such as an MPEG file.

As shown in FIG. 1, the image transmission terminal 40 transmits image data acquired from the camera 30 via the communication network 103 to the server state judging device 105. The image transmission terminal 40 receives a command from the server state judging device 10, sends an image capturing command to the camera 30, and acquires image data from the camera 30. The above is a description concerning the configuration of the server monitoring device 10.

The server state judging device 105 is, for example, a personal computer that the monitoring person 101 owns, and displays an image of a light emission pattern of the projecting plate 22B on a monitor. The monitoring person 101 can send an image capturing command to the camera 30 from the server state judging device 105, and light up the reference light-emitting elements 24.

The server state judging device 105 analyzes the light emission pattern of the projecting plate 22B based on the image data acquired from the image transmission terminal 40, and judges the state of the server 90. In detail, from the image of the light emission pattern, the server state judging device analyzes the lighting modes of each optical fiber 20 by using light emission of the reference light-emitting elements 24 as a reference, and judges the states of each server apparatus 91. When there is no fault in any of the server apparatuses 91, the server state judging device informs the server apparatuses 91 are normal, and when there is a fault in any of the server apparatuses 91, the server state judging device informs the server apparatus 91 at fault and the cause of the fault (for example, a hard disk fault or a network connection error, etc.). The server state judging device 105 that is analyzing the light emission pattern and judging the state of the server 90 corresponds to the "server state judging device" of the present invention. The server state judging device 105 can perform software processing to arbitrarily change the assignment of the coordinates in the light emission pattern and the light-emitting elements 92. Accordingly, for example, an operation such as extraction of only the power indication lights of the server apparatuses 91 and checking of these, etc., can be performed, and it becomes possible to judge the states of the server apparatuses 91 depending on the circumstances.

A description has been given above concerning the configurations of the server monitoring device 10 and the server monitoring system 100. According to the server monitoring device 10 and the server monitoring system 100 according to the present embodiment, the plurality of optical fibers 20 are optically coupled to the plurality of light-emitting elements 92 that show the operating state of the server 90 by lighting modes, and the end surfaces of the plurality of optical fibers 20 on the side opposite to the light-emitting elements 92 are secured in a predetermined arrangement, so that from the light emission pattern of these end surfaces, the operating state of the server 90 can be grasped. An image of the light emission pattern is captured by the camera 30, and the captured image is transmitted to the monitoring person 101, so that the conventional labor of an operator dispatched to the installation location of the server 90 to check the light-emitting elements 92 can be eliminated, and it becomes possible to quickly grasp the state of the server 90. In addition, even if the plurality of light-emitting elements 92 are disposed at positions distant from each other, the lighting modes of the plurality of light-emitting elements 92 can be captured in one image, so that it becomes possible to more quickly check the state of the server 90. With this configuration, operator mistakes in checking of the light-emitting elements 92 can be eliminated, so that the state of the server 90 can be more precisely grasped.

In addition, according to the present embodiment, the light-emitting elements 92 provided on the server 90 can be utilized, so that the server 90 does not need to be additionally provided with, for example, a function to transmit electric signals showing its own state to the monitoring person 101. Therefore, by only attaching the server monitoring device 10 to an existing server 90, the server monitoring system 100 can be established.

Second Embodiment

Figure 8:
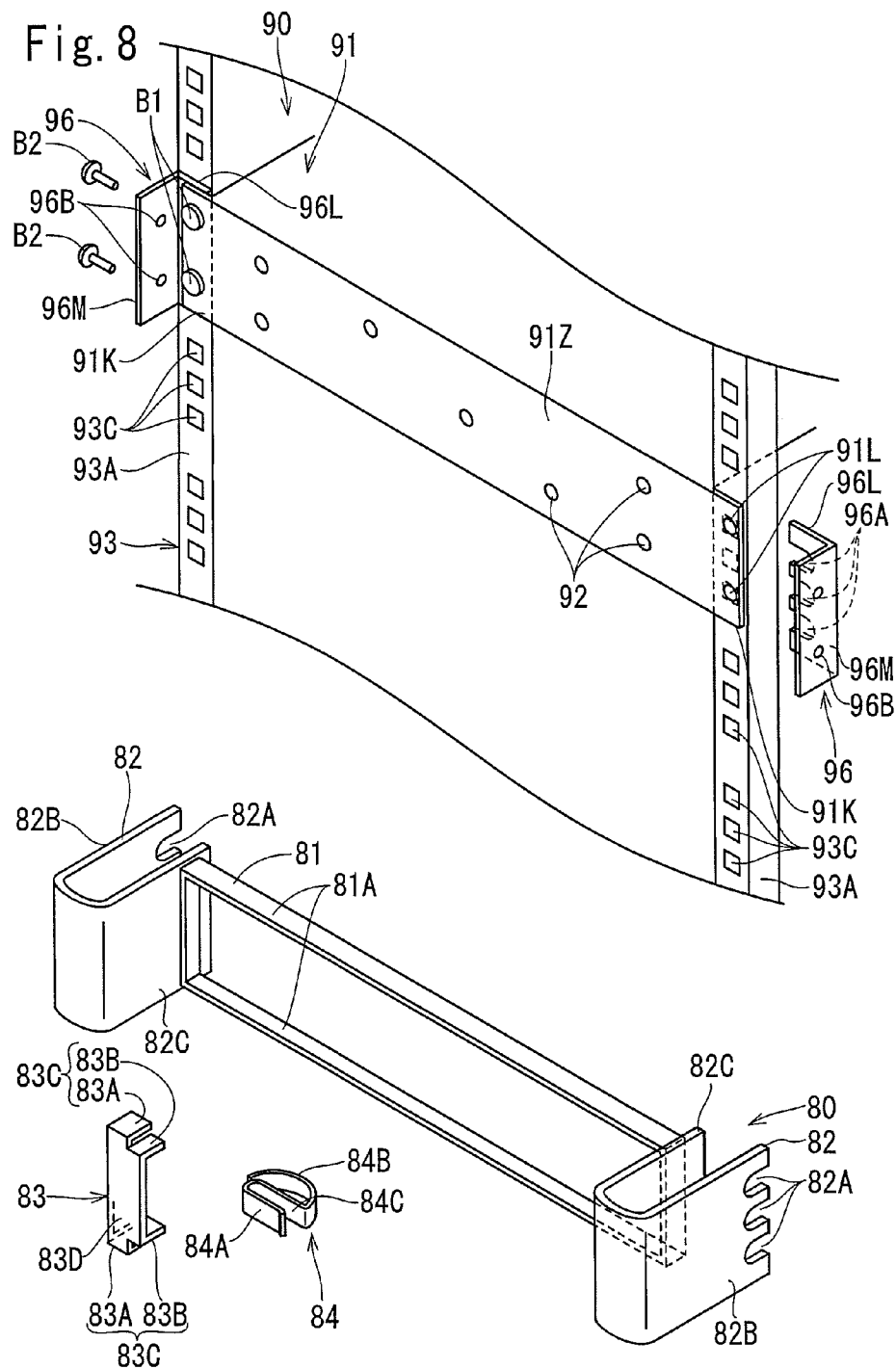
FIG. 8 is a perspective view of a support frame, a bridge bar, etc., according to a second embodiment.
Figure 9:
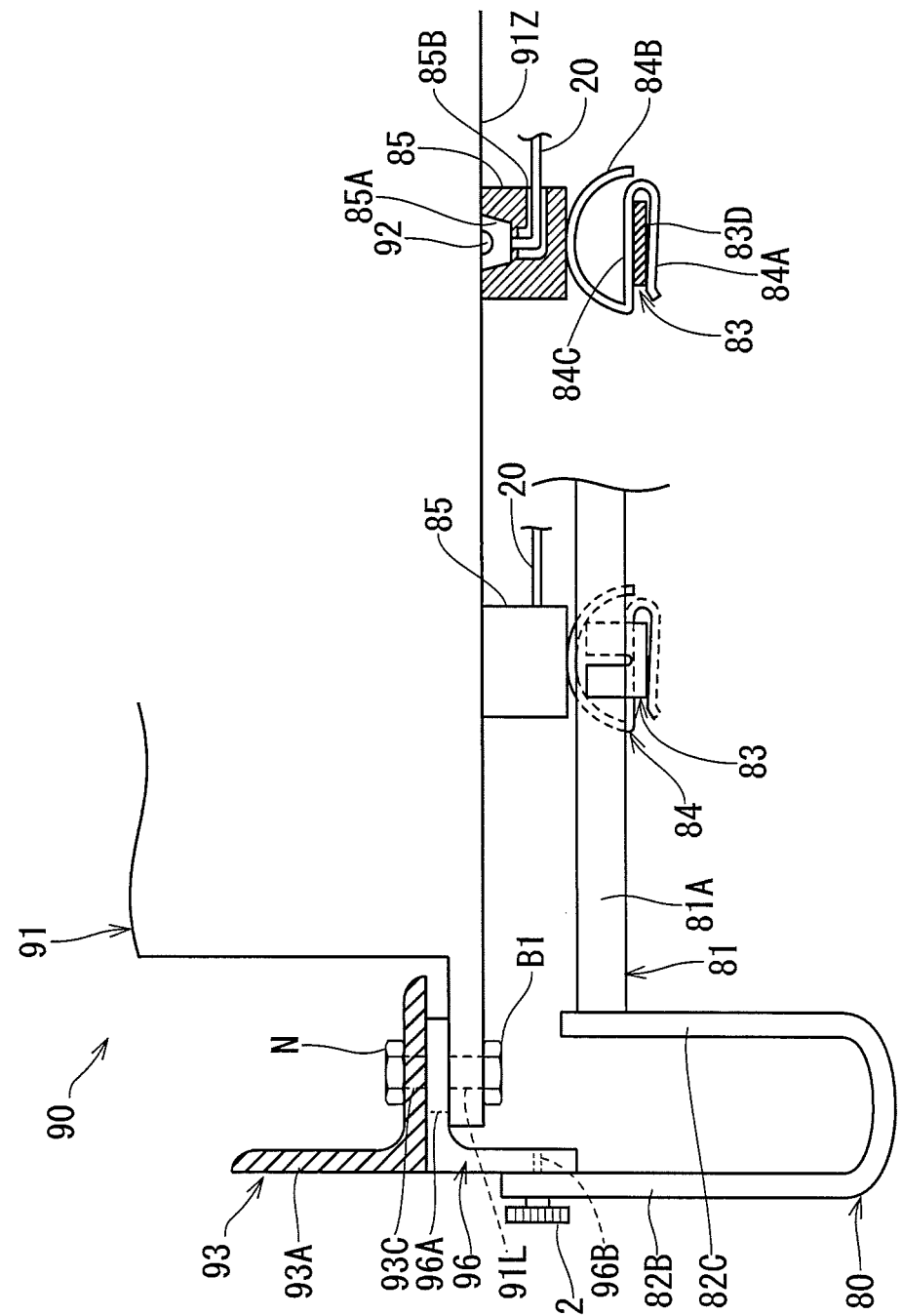
FIG. 9 is a plan view of a state where an optical fiber is coupled to a light-emitting element.

The present embodiment is shown in FIG. 8 and FIG. 9, and is different from the first embodiment in structure to optically join one end portions of the group of the optical fibers 20 to the light-emitting elements 92. In detail, as shown in FIG. 8, the above-described server rack 93 has columnar supports 93A formed of angle materials on four corners, and in the left and right columnar supports 93A, 93A on the front side of the server rack 93, a plurality of attaching holes 93C penetrating in the front-rear direction are arranged vertically in a row.

In each server apparatus 91 constituting the server 90, a pair of attaching pieces 91K, 91K project sideward from the front end edges of both side surfaces, and in each of these attaching pieces 91K, a pair of attaching holes 91L, 91L are arranged vertically. As shown in FIG. 9, the attaching holes 91L of the server apparatus 91 are overlaid with the attaching holes 93C of the server rack 93, and bolts B1 are inserted through these attaching holes and screwed with nuts N, and accordingly, each server apparatus 91 is secured to the server rack 93.

Between the respective attaching pieces 91K of the server apparatus 91 and the columnar supports 93A, brackets 96 are jointly fastened, respectively. As shown in FIG. 8, the bracket 96 has, for example, a plurality of notches 96A disposed at the same pitches as those of the attaching holes 93C on one tabular portion 96L of the angle material cut into a predetermined length while having a pair of screw holes 96B, 96B arranged vertically in the other tabular portion 96M. The tabular portion 96L having the plurality of notches 96A of the bracket 96 is sandwiched between the attaching piece 91K and the columnar support 93A, and the other tabular portion 96M is secured while projecting to the front side of the server rack 93, and to this tabular portion 96M, a support frame 80 is secured.

The support frame 80 is structured to have a pair of guide support portions 82, 82 on both left and right sides of a horizontally-long frame body 81. Each side of the frame body 81 has a band plate shape and the plate thickness directions are oriented in the inside-outside directions of the frame body 81. Guide support portion 82 are each formed by curving a plate into a U shape, and in a state where the outer surfaces of the shorter sides of the frame body 81 are overlaid with one tabular portions 82C corresponding to one sides of the U shapes and the curved portions of the U shapes are disposed on the front side of the frame body 81, the frame body 81 and the guide support portions 82, 82 are welded or screwed to each other. In the other tabular portion 82B of each guide support portion 82, a plurality of attaching grooves 82A formed by notching the tip end portion into concave shapes are arranged vertically.

The support frame 80 is secured to the server rack 93 by sandwiching the edge portions of the attaching grooves 82A of the tabular portions 82B between the head portions of each bolt B2 fastened into the screw holes 96B of the brackets 96 and the brackets 96. Accordingly, the frame body 81 is disposed in front of and in parallel with the front surface 91Z of the server apparatus 91. Here, for example, in a case where gate-shaped handle portions (not shown) project from both attaching pieces 91K, 91K of the server apparatus 91, in a state where the handle portions are accommodated inside the curved structures of the guide support portions 82, 82, the support frame 80 is secured to the brackets 96, 96.

The pair of longer side portions of the frame body 81 correspond to the pair of linear motion guides 81A, 81A according to the present invention, and between the pair of linear motion guides 81A, 81A, an arbitrary number of bridge bars 83 according to the present invention can be bridged and attached. The bridge bar 83 is structured to have guide mounting portions 83C, 83C on both end portions of a band-shaped rail portion 83D extending vertically. Each guide mounting portion 83C consists of a pair of clamping pieces 83A, 83B, and when the pairs of clamping pieces are inserted to the pair of linear motion guides 81A, 81A from the side opposite to the server apparatus 91 side, the linear motion guides 81A are clamped between the clamping pieces 83A, 83B. In detail, the bridge bar 83 has a structure that the upper and lower end portions of a band-shaped plate are longitudinally two-divided to form two projecting pieces on each of the upper and lower sides, that is, four projecting pieces in total, and these projecting pieces are bent at right angles toward one side of the rail portion 83D, and the bent portions of the projecting pieces adjacent to each other are shifted vertically from each other, and accordingly, the guide mounting portions 83C consisting of the pair of clamping pieces 83A, 83B are formed on both end portions of the rail portion 83D. On the linear motion guide 81A, a locking protrusion strip (not shown) is formed, and on the clamping pieces 83A, 83B, a locking groove that is locked to the locking protrusion strip is formed. The bridge bar 83 may also be structured so that magnets are incorporated in the guide mounting portions 83C so as to be adsorbed and secured to the frame body 81.

To the rail portion 83D of the bridge bar 83 bridged between the linear motion guides 81A, 81A, an arbitrary number of cushion clips 84 (corresponding to the "cushioning member" of the present invention) can be attached. The cushion clip 84 is formed by curving a band-shaped spring leaf, and is structured so that one end portion of an arc portion 84B curved in a semicircular shape is folded in the diameter direction of the semicircle of the arc portion 84B to form a first clamping piece 84C, and the tip end of the first clamping piece 84C is folded back to the side opposite to the arc portion 84B into a hairpin shape to form a second clamping piece 84A. The cushion clip is attached at an arbitrary position in the longitudinal direction of the rail portion 83D by sandwiching the rail portion 83D between the first and second clamping pieces 84A, 84C.

As shown in FIG. 9, to the tip end portion of each optical fiber 20 according to the present embodiment, a securing adapter 85 that is partially or entirely transparent is attached, and this securing adapter 85 is clamped by the cushion clip 84 attached to the bridge bar 83 and the front surface 91Z of the server apparatus 91. This securing adapter 85 has, for example, a rectangular parallelepiped shape, and has a front surface recessed portion 85A on a surface to be placed on the front surface 91Z of the server apparatus 91. In the securing adapter 85, a communication hole 85B communicating with the front surface recessed portion 85A is formed. The communication hole 85B extends from one side surface of the securing adapter 85 to the central portion and then curves and extends to the innermost surface of the front surface recessed portion 85A and is opened. By inserting one end portion of the optical fiber 20 into the communication hole 85B from one side surface of the securing adapter 85, the end surface of the optical fiber 20 can be secured while being disposed on the innermost surface of the front surface recessed portion 85A.

A description has been given above concerning the configuration of the present embodiment. To couple the optical fibers 20 to the light-emitting elements 92 of the server apparatus 91 by using the support frame 80 of the present embodiment, first, depending on the number and disposition of the light-emitting elements 92 provided on the front surface 91Z of the server apparatus 91, an arbitrary number of bridge bars 83 are bridged at arbitrary positions in the longitudinal directions of the pair of linear motion guides 81A, 81A. Then, an arbitrary number of cushion clips 84 are mounted at arbitrary positions of the bridge bars 83, and securing adapters 85 attached to the tip ends of the optical fibers 20 are clamped between cushion clips 84 and the front surface 91Z of the server apparatus 91. Accordingly, to the respective light-emitting elements 92, one end portions of the optical fibers 20 can be easily optically joined. The light-emitting elements 92 and the end surfaces of the optical fibers 20 are made to face each other inside the front surface recessed portions 85A of the securing adapters 85, so that ambient light can be prevented from being taken into the optical fibers 20. In addition, the securing adapter 85 is partially or entirely transparent, so that the lighting state of the light-emitting element 92 can be visually checked from the outside even in the state where the securing adapter 85 is attached.

Third Embodiment

Figure 10:
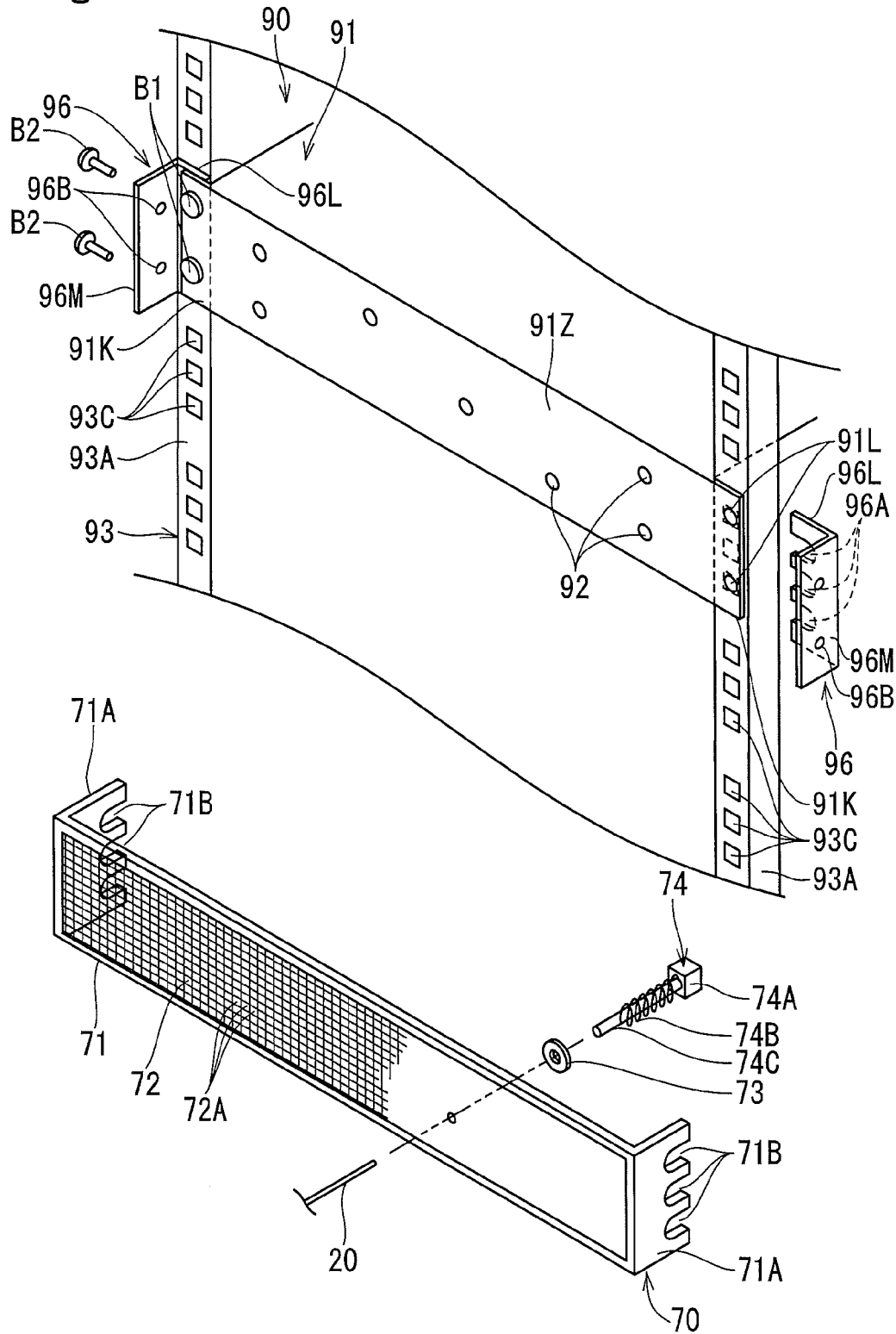
FIG. 10 is a perspective view of a support net panel and a fiber holder, etc., according to a third embodiment.
Figure 11:
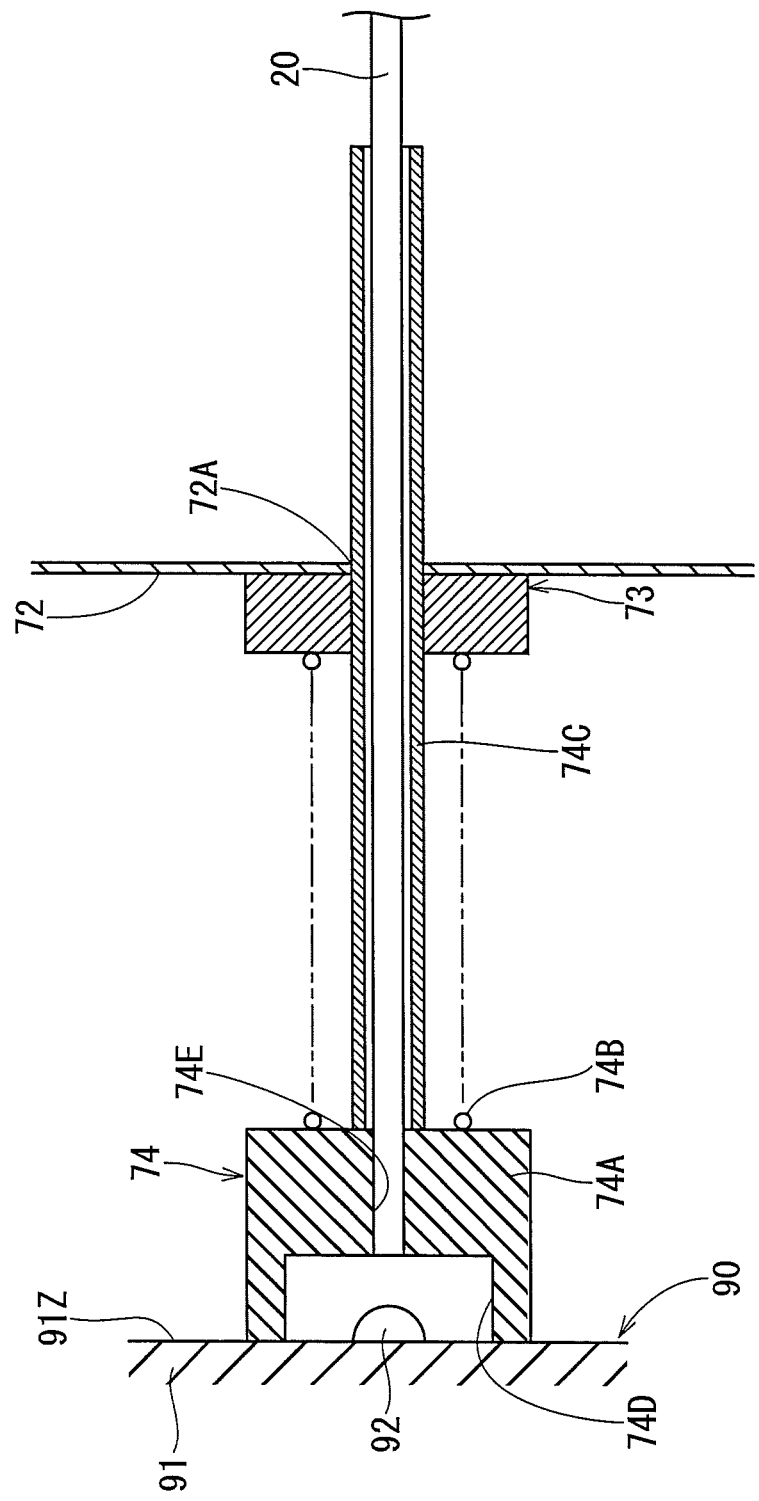
FIG. 11 is a sectional side view of the fiber holder.
Figure 12:
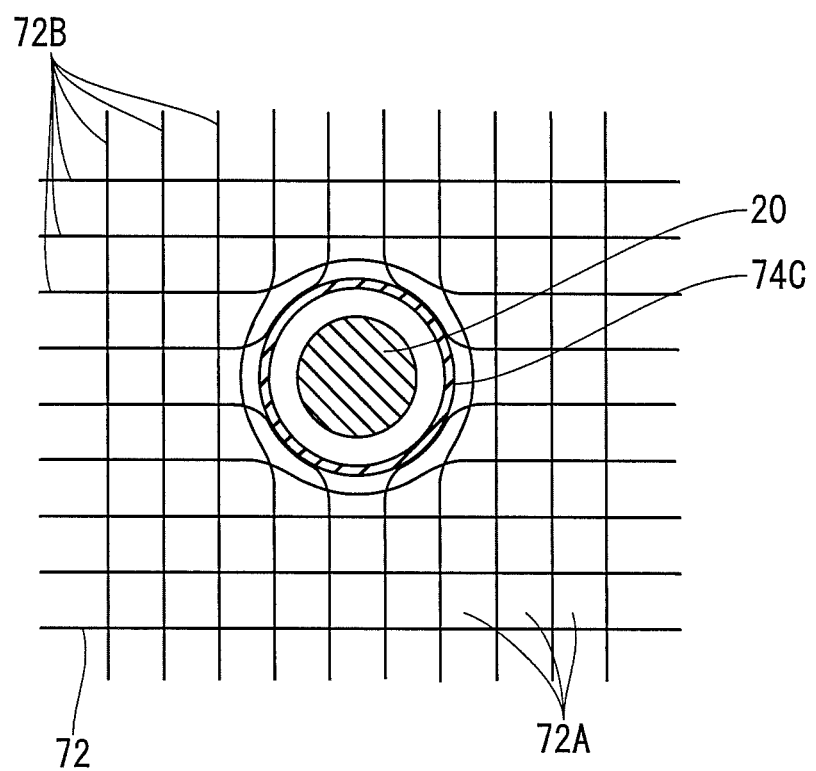
FIG. 12 is a sectional view of a state where a support pipe penetrates through a mesh.

The present embodiment is shown in FIG. 10 to FIG. 12, and is different from the first and second embodiments in the structure to optically join one end portions of the group of the optical fibers 20 to the light-emitting elements 92. Hereinafter, only differences in configuration from the second embodiment are described.

FIG. 10 shows a support net panel 70 according to the present invention. The support net panel 70 is formed by stretching a net body 72 over the inside of a frame body 71 having a horizontally-long rectangular shape. From both end portions in the traverse direction of the frame body 71, a pair of attaching pieces 71A, 71A project in the same direction, and on the tip end portions of these attaching pieces 71A, 71A, a plurality of attaching grooves 71B similar to the attaching grooves 82A of the second embodiment described above are provided. Similarly to the support frame 80 of the second embodiment described above, the support net panel 70 is secured to the server rack 93 via brackets 96, and the net body 72 faces the entire front surface 91Z of the server apparatus 91.

At an arbitrary position on the net body 72, a fiber holder 74 can be attached. The fiber holder 74 is structured so that a tip end head portion 74A secured to the tip end of a support pipe 74C is provided, and a compression coil spring 74B and a washer 73 are inserted in order outside the support pipe 74C. Into an arbitrary mesh 72A of the net body 72, the tip end portion of the support pipe 74C (the end portion on the side opposite to the tip end head portion 74A) is inserted from the server apparatus 91 side. Accordingly, as shown in FIG. 11, between the tip end head portion 74A and the washer 73, the compression coil spring 74B is compressed and due to its spring force, the tip end head portion 74A is pressed against and secured to the front surface 91Z of the server apparatus 91. The sectional shape of the support pipe 74C is larger than the mesh 72A, and when the support pipe 74C is pushed into the mesh 72A, as shown in FIG. 12, the wire materials 72B constituting the mesh body 72 warp and due to their reaction forces, the support pipe 74C is secured.

As shown in FIG. 10, the tip end head portion 74A has, for example, a rectangular parallelepiped shape, and is structured to have a front surface recessed portion 74D on the surface to be placed on the front surface 91Z of the server apparatus 91, and a securing hole 74E communicating with the inside of the support pipe 74C is opened to the innermost surface of the front surface recessed portion 74D. The optical fiber 20 is inserted into the securing hole 74E from the base end portion side of the support pipe 74C, and the tip end surface of the optical fiber 20 is disposed and secured to the innermost surface of the front surface recessed portion 74D.

A description has been given above concerning the configuration of the present embodiment. To couple optical fibers 20 to the light-emitting elements 92 of the server apparatus 91 by using the support net panel 70 of the present embodiment, first, depending on the number and disposition of light-emitting elements 92 provided on the front surface 91Z of the server apparatus 91, support pipes 74C of fiber holders 74 are inserted into arbitrary meshes 72A of the net body 72, and between the net body 72 and the front surface 91Z of the server apparatus 91, the fiber holders 74 are secured. Then, the optical fibers 20 are inserted into the support pipes 74C of each fiber holder 74 from the tip end sides, and the tip end portions of the optical fibers 20 are secured into the securing holes 74E in the fiber holders 74. Accordingly, one end portions of the optical fibers 20 can be easily optically joined to the light-emitting elements 92, respectively.

Other Embodiments

The present invention is not limited to the above-described embodiments, and for example, embodiments described below are also included in the technical scope of the present invention, and further, other than the embodiments described below, various modifications are also possible without departing from the spirit of the present invention.

(1) The server monitoring device 10 and the server monitoring system 100 according to the above-described embodiments may be used by a rental server provider to monitor the state of a server that the rental server provider has rented to another person, or used by a person who owns his/her own server at a remote site to monitor his/her own server.

(2) Transmission of image data from the camera 30 to the image transmission terminal 40 may be automatically performed when the camera 30 captures it.

(3) In the embodiments described above, the image transmission terminal 40 having acquired an image of a light emission pattern from the camera 30 transmits the image to the monitoring person 101, however, a camera with a built-in WEB server function may be used to directly transmit the image from the camera to the monitoring person 101. In this case, the camera with a built-in WEB server function corresponds to the "camera" and the "image transmitting means" of the present invention. From the camera 30 to the image transmission terminal 40, an image is transmitted by network connection, however, an image may be transmitted by connection using a USB cable or the like.

(4) In the embodiments described above, only one camera 30 is provided, however, a plurality of cameras 30 may be provided. With this configuration, even if any of the cameras 30 malfunctions, an image of a light emission pattern can be captured.

(5) Light emission of the operation check lamp of the camera 30 may be taken in by an optical fiber, and an image of light emission from the end surface of this optical fiber may be captured by the camera 30 itself. Accordingly, the operating state of the camera 30 can be checked.

(6) Serial numbers may be assigned to the plurality of light-emitting elements 92, and the plurality of optical fibers 20 may be arranged in the order of the numbers of the light-emitting elements 92 to which the optical fibers are coupled. As a way of arranging the optical fibers 20, they may be arranged in order in a line, or ten may be arranged per line.

(7) In the embodiments described above, the server state judging device 105 judges the state of the server 90, however, the monitoring person 101 having viewed an image of a light emission pattern captured by the camera 30 in the server state judging device 105 may judge the state of the server 90.

(8) The bridge bar 83 of the second embodiment described above is mounted to the linear motion guides 81A, 81A from the side opposite to the server apparatus 91 side, however, the bridge bar 83 may be mounted to the linear motion guides 81A, 81A from the server apparatus 91 side. In this case, even without forming the locking protrusion strip and the locking grooves, the bridge bar 83 can be mounted to the linear motion guides 81A, 81A without coming off the linear motion guides due to the resilient force of the cushion clip 84.

(9) In the second embodiment described above, the securing adapter 85 on the tip end of the optical fiber 20 is sandwiched and secured between the front surface 91Z of the server apparatus 91 and the cushion clip 84, however, for example, a securing adapter may be secured to a clip that can be secured to an arbitrary position in the longitudinal direction of the bridge bar so as to be disposed to face the light-emitting element without pressing the securing adapter against the server apparatus.

Figure 13:
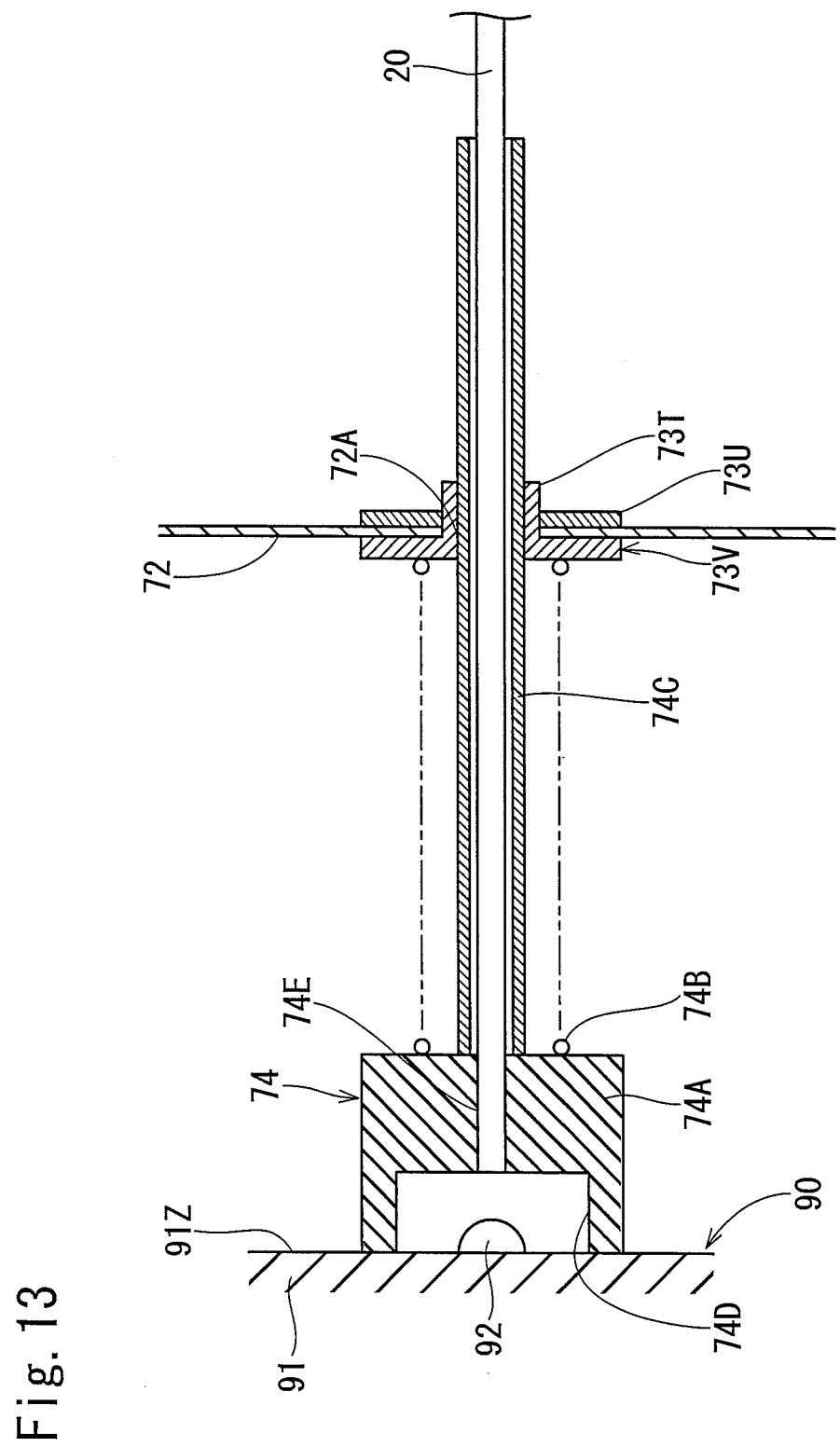
FIG. 13 is a sectional side view of the fiber holder.

(10) As shown in FIG. 13, it is also possible that a part of the third embodiment described above is changed to have a configuration in which a sleeve 73T to be pushed into the mesh 72A is made to project from the washer 73V, and a sub washer 73U is press-fitted to the sleeve 73T from the side opposite to the washer 73V across the net body 72 so that the net body 72 is clamped between the washer 73V and the sub washer U. With this configuration, the fiber holder 74 is firmly secured to the net body 72.

Figure 14:
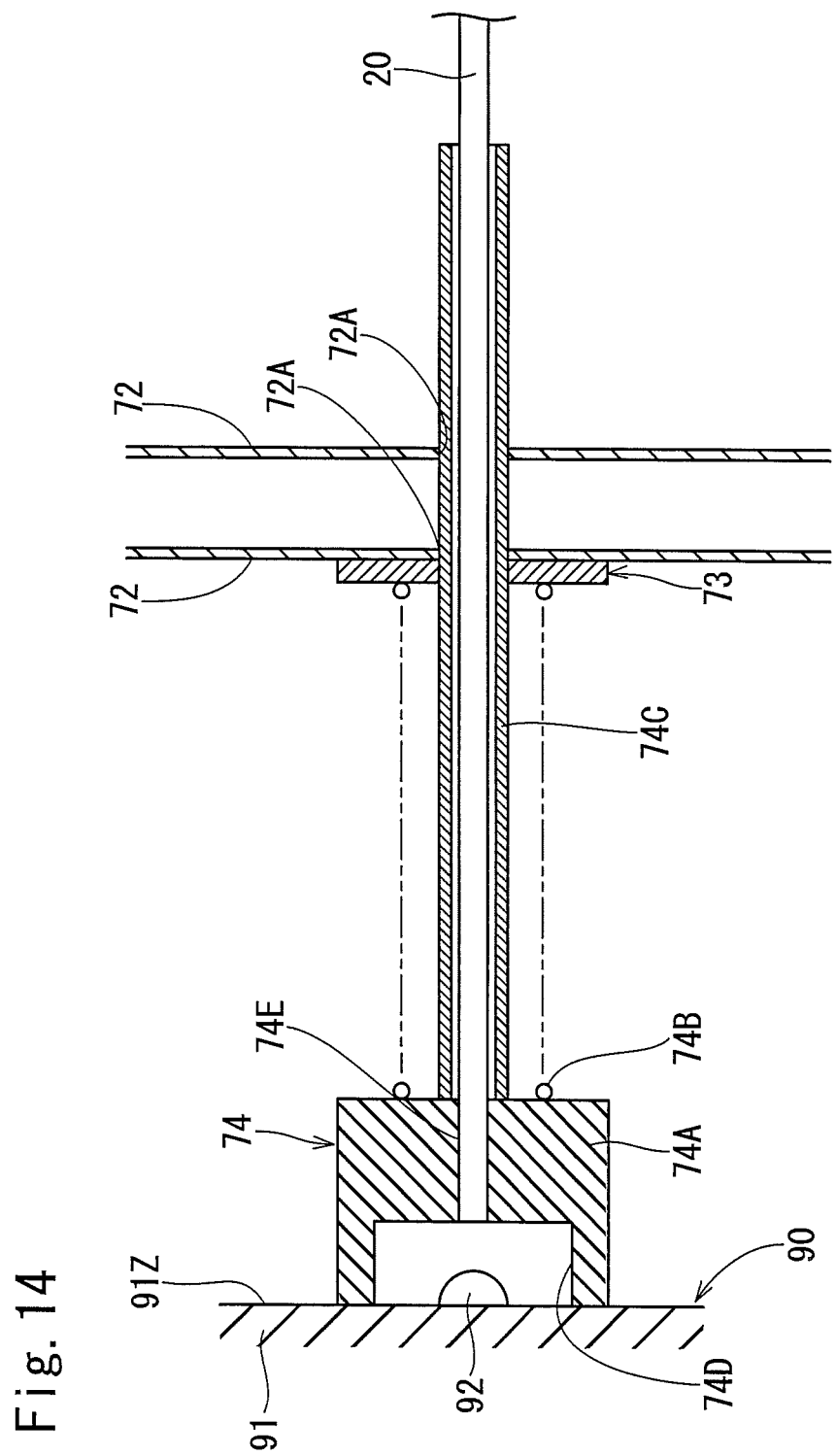
FIG. 14 is a sectional side view of the fiber holder.

(11) It is also possible that a part of the third embodiment described above is changed to have a configuration in which a pair of net bodies 72, 72 are secured to the frame body 71 (refer to FIG. 10) of the support net panel 70 while disposed to face each other, and as shown in FIG. 14, the support pipe 74C is inserted through both meshes 72A, 72A of the net bodies 72, 72. With this configuration, the support pipe 74C is firmly held in a horizontal posture.

(12) As well as the image of the light-emitting elements 92 of the server apparatus 91, the states of temperature, humidity, voltage, earthquake sensing, etc., may also be converted into data by using sensors, and transmitted in addition to the image data.

(13) In the embodiments described above, three reference light-emitting elements 24 are provided, however, the reference light-emitting elements 24 may not be provided, or the number of provided reference light-emitting elements may be other than three. Here, in the case where the camera is secured and the image capturing range and image capturing direction are fixed, the coordinate positions can be identified without the reference light-emitting elements 24. When one reference light-emitting element 24 is provided, even if the image capturing range shifts, the coordinate positions can be identified as long as camera zooming and image capturing direction are fixed. When two reference light-emitting elements 24 are provided, even if camera zooming differs, the coordinate positions can be identified as long as the image capturing direction is fixed.

(14) In the embodiments described above, the securing adapter 85 is partially or entirely transparent, however, it may be opaque. When it is opaque, ambient light can be further prevented from being taken into the optical fiber 20.

REFERENCE SIGNS LIST

10 Server monitoring device
20 Optical fiber
22 Indication board (optical fiber terminal end securing means)
24 Reference light-emitting element
26 Environmental light optical fiber
27 Reflected light optical fiber
28 Outgoing light optical fiber (output means)
29 Light source (output means)
30 Camera
31 Light shielding box
40 Image transmission terminal (image transmitting means)
70 Support net panel (optical fiber starting end securing means)
71 Frame body
72 Net body
72A Mesh
74 Fiber holder (second optical fiber holding member, optical fiber starting end securing means)
74A Tip end head portion
74B Compression coil spring
74C Support pipe
74D Front surface recessed portion
71A Linear motion guide
73 Bridge bar
84 Cushion clip (cushioning member, optical fiber starting end securing means)
85 Securing adapter
85A Front surface recessed portion
90 Server
92 Light-emitting element
93 Server rack
94 Opening and closing door
94A Optical fiber insertion hole
95 Server room
100 Server monitoring system
101 Borrower (monitoring person)
103 Communication network
105 Server state judging device

The invention claimed is:

1. A server monitoring device to be used for monitoring the state of a server accessible via a communication network from a remote site, comprising:
an optical fiber starting end securing means that holds one end portions of a plurality of optical fibers in a state where the one end portions are optically coupled to a plurality of light-emitting elements that are provided on a front surface of the server and indicate the state of the server;
an optical fiber terminal end securing means that holds end surfaces of the other end portions of the plurality of optical fibers so as to be in a predetermined arrangement;
a camera that captures an image of a light emission pattern of the arrangement of the end surface group of the optical fibers;
an image transmitting means for transmitting the image of the light emission pattern to a monitoring terminal for allowing a person to monitor the server;
a plurality of reference light-emitting elements that are provided on the optical fiber terminal end securing means and can emit light at reference positions at which the end surfaces of the optical fibers are arranged;
a pair of linear motion guides as the optical fiber starting end securing means that are attached to a server rack accommodating the server and extend in parallel to a first direction being either one of left-right and up-down directions of the front surface of the server;
a plurality of bridge bars as the optical fiber starting end securing means that extend in a second direction being the other one of the left-right and up-down directions and are bridged at arbitrary positions in the longitudinal directions of the pair of linear motion guides; and
an optical fiber holding member as the optical fiber starting end securing means that is attached at an arbitrary position in a longitudinal direction of the bridge bars and can hold the one end portion of the optical fiber in a state where the one end portion is optically coupled to the light-emitting element.

2. The server monitoring device according to claim 1, comprising:
the optical fiber holding member including a securing adapter that is attached to the one end portion of the optical fiber and covers the light-emitting element, and a cushioning member that is mounted at an arbitrary position in the longitudinal direction of each bridge bar and clamps the securing adapter between the cushioning member and the front surface of the server; and
the securing adapter that has a front surface recessed portion recessed in a surface facing the light-emitting element and holds the optical fiber in a state where the end surface of the optical fiber is made to face the light-emitting element from the inner side of the front surface recessed portion.

3. A server monitoring device to be used for monitoring the state of a server accessible via a communication network from a remote site, comprising:
an optical fiber starting end securing means that holds one end portions of a plurality of optical fibers in a state where the one end portions are optically coupled to a plurality of light-emitting elements that are provided on a front surface of the server and indicate the state of the server;

an optical fiber terminal end securing means that holds end surfaces of the other end portions of the plurality of optical fibers so as to be in a predetermined arrangement;

a camera that captures an image of a light emission pattern of the arrangement of the end surface group of the optical fibers;

an image transmitting means for transmitting the image of the light emission pattern to a monitoring terminal for allowing a person to monitor the server;

a plurality of reference light-emitting elements that are provided on the optical fiber terminal end securing means and can emit light at reference positions at which the end surfaces of the optical fibers are arranged;

a support net panel as the optical fiber starting end securing means, formed by stretching a net body over the inside of a frame body to be attached to a server rack accommodating the server; and an optical fiber holding member as the optical fiber starting end securing means that secures the one end portion of the optical fiber in a state where the one end portion is inserted through an arbitrary mesh of the net body and can hold the one end portion of the optical fiber in a state where the one end portion is optically coupled to the light-emitting element.

4. The server monitoring device according to claim 3, comprising:

the optical fiber holding member including a support pipe which is inserted through the arbitrary mesh of the net body and through the inside of which the optical fiber can be inserted, a tip end head portion that is secured to a tip end of the support pipe and is placed on the front surface of the server to cover the light-emitting element, and a compression coil spring that is provided outside the support pipe and stretched between the net body and the tip end head portion and presses the tip end head portion against the front surface of the server; and the tip end head portion that has a front surface recessed portion recessed in a surface facing the light-emitting element, and holds the optical fiber in a state where the end surface of the optical fiber is made to face the light-emitting element from the inner side of the front surface recessed portion.

5. The server monitoring device according to claim 1, comprising: a light shielding box that houses the optical fiber terminal end securing means and the camera and blocks light from the outside.

6. The server monitoring device according to claim 2, comprising: a light shielding box that houses the optical fiber terminal end securing means and the camera and blocks light from the outside.

7. The server monitoring device according to claim 3, comprising: a light shielding box that houses the optical fiber terminal end securing means and the camera and blocks light from the outside.

8. The server monitoring device according to claim 4, comprising: a light shielding box that houses the optical fiber terminal end securing means and the camera and blocks light from the outside.

9. The server monitoring device according to claim 1, comprising:

an environmental light optical fiber that takes in indoor light of a server room in which the server is placed from an end surface of one end portion and outputs the light from an end surface of the other end portion;

the optical fiber terminal end securing means that holds the environmental light optical fiber so that an image of the end surface of the other end portion of the environmental light optical fiber is captured by the camera.

10. The server monitoring device according to claim 3, comprising:

an environmental light optical fiber that takes in indoor light of a server room in which the server is placed from an end surface of one end portion and outputs the light from an end surface of the other end portion;

the optical fiber terminal end securing means that holds the environmental light optical fiber so that an image of the end surface of the other end portion of the environmental light optical fiber is captured by the camera.

11. The server monitoring device according to claim 5, comprising:

an environmental light optical fiber that takes in indoor light of a server room in which the server is placed from an end surface of one end portion and outputs the light from an end surface of the other end portion;

the optical fiber terminal end securing means that holds the environmental light optical fiber so that an image of the end surface of the other end portion of the environmental light optical fiber is captured by the camera.

12. The server monitoring device according to claim 7, comprising:

an environmental light optical fiber that takes in indoor light of a server room in which the server is placed from an end surface of one end portion and outputs the light from an end surface of the other end portion;

the optical fiber terminal end securing means that holds the environmental light optical fiber so that an image of the end surface of the other end portion of the environmental light optical fiber is captured by the camera.

13. A server monitoring system comprising:
the server monitoring device according to claim 1; and
a server state judging device that receives an image of the light emission pattern from the server monitoring device via a communication network and judges the state of the server.

14. A server monitoring system comprising:
the server monitoring device according to claim 3; and
a server state judging device that receives an image of the light emission pattern from the server monitoring device via a communication network and judges the state of the server.

15. A server monitoring system comprising:
the server monitoring device according to claim 5; and
a server state judging device that receives an image of the light emission pattern from the server monitoring device via a communication network and judges the state of the server.

16. A server monitoring system comprising:
the server monitoring device according to claim 7; and
a server state judging device that receives an image of the light emission pattern from the server monitoring device via a communication network and judges the state of the server.

17. A server monitoring system comprising:
the server monitoring device according to claim 9; and
a server state judging device that receives an image of the light emission pattern from the server monitoring device via a communication network and judges the state of the server.

18. A server monitoring system comprising:
the server monitoring device according to claim 10; and
a server state judging device that receives an image of the light emission pattern from the server monitoring device via a communication network and judges the state of the server.

19. A server monitoring system comprising:
the server monitoring device according to claim 11; and
a server state judging device that receives an image of the light emission pattern from the server monitoring device via a communication network and judges the state of the server.

20. A server monitoring system comprising:
the server monitoring device according to claim 12; and
a server state judging device that receives an image of the light emission pattern from the server monitoring device via a communication network and judges the state of the server.

\* \* \* \* \*